United States Patent [19]

Swars

[11] Patent Number: 4,993,282

[45] Date of Patent: Feb. 19, 1991

[54] ASSEMBLED SHAFT, ESPECIALLY CAMSHAFT, CRANKSHAFT OR DRIVESHAFT

[75] Inventor: Helmut Swars, Bergisch Gladbach, Fed. Rep. of Germany

[73] Assignee: Emitec Gesellschaft für Emissionstechnologie mbH

[21] Appl. No.: 423,681

[22] Filed: Oct. 17, 1989

Related U.S. Application Data

[63] Continuation-in-part of Ser. No. 305,431, Feb. 1, 1989, abandoned.

[30] Foreign Application Priority Data

Feb. 7, 1988 [DE] Fed. Rep. of Germany ....... 3803683

[51] Int. Cl.$^5$ .............................................. F16H 53/00
[52] U.S. Cl. ........................................ 74/567; 29/523; 123/90.60
[58] Field of Search .................... 74/567, 568 R, 569; 29/523, 421.1 O, 156.4 R, 522.1; 123/90.60, 90.27, 90.17, 90.18, 509, 495; 228/135, 136

[56] References Cited

U.S. PATENT DOCUMENTS

| | | | |
|---|---|---|---|
| 3,869,938 | 3/1975 | Schlotterbeck et al. | 74/567 |
| 4,382,390 | 5/1983 | Jordan | 74/567 |
| 4,530,527 | 7/1985 | Holmberg | 29/523 X |
| 4,638,683 | 1/1987 | Ogawa et al. | 74/567 |
| 4,644,912 | 2/1987 | Umeha et al. | 74/567 X |
| 4,660,269 | 4/1987 | Suzuki | 29/523 |
| 4,750,250 | 6/1988 | Maus et al. | 74/567 X |
| 4,761,870 | 8/1988 | Urano | 29/156.4 R X |
| 4,781,076 | 11/1988 | Hartnett et al. | 74/567 |
| 4,798,178 | 1/1989 | Greulich et al. | 29/156.4 R X |
| 4,809,562 | 3/1989 | Bendoraitas et al. | 123/90.6 X |

FOREIGN PATENT DOCUMENTS

| | | | |
|---|---|---|---|
| 3409541 | 11/1985 | Fed. Rep. of Germany | 74/567 |
| 3633435 | 4/1988 | Fed. Rep. of Germany | 74/567 |
| 0039356 | 4/1981 | Japan | 74/567 |
| 0266132 | 11/1986 | Japan | 29/156.4 R |
| 0282663 | 12/1986 | Japan | 29/523 |
| 88/00643 | 1/1988 | PCT Int'l Appl. | 74/567 |
| 1117816 | 6/1968 | United Kingdom | 74/567 |
| 2050207 | 1/1981 | United Kingdom | 29/523 |

Primary Examiner—Vinh T. Luong
Attorney, Agent, or Firm—Toren, McGeady & Associates

[57] ABSTRACT

An assembled shaft, especially a camshaft, crankshaft or driveshaft, consisting of a tubular member and individually slid-on driving elements attached in an essentially force-locking way by hydraulically expanding the tube in portions, with an increased torsional strength, is produced in that between each two driving elements there is slid-on a sleeve which has a diameter greater than that of the tubular member and which comprises collar regions guided on the tubular member, with the collar regions extending underneath the driving elements along half the axial length and being clamped-in in an essentially force-locking way between the tubular member and the driving element.

15 Claims, 2 Drawing Sheets

ASSEMBLED SHAFT, ESPECIALLY CAMSHAFT, CRANKSHAFT OR DRIVESHAFT

This is a continuation-in-part application of Ser. No. 305,431, filed Feb. 1, 1989, now abandoned.

BACKGROUND OF THE INVENTION

1. Field of the Invention

The invention relates to an assembled shaft, especially a camshaft, crankshaft or driveshaft consisting of a tubular member and driving elements which are slid onto the tubular member individually and which are fixed in an essentially force-locking way by hydraulically expanding portions of the tubular member.

2. Description of the Prior Art

Shafts of the above type are known from P 36 33 534.9, for example. As these shafts are to replace previously used cast or forged shafts of the same outer configuration while reducing their weight and mass inertia moment, they have to meet the same requirements regarding load bearing capacity, especially bending strength and torsional strength particularly in the case of control shafts, i.e., camshafts for operating exhaust and inlet valves or camshafts in injection pumps connected in series, a high torsional strength has to be ensured because angular displacements caused by torsion may adversely affect the combustion processes. A simple solution consists in using tubular members of a greater wall thickness and/or tube materials of higher strength. The first solution has its limitations because, due to the internal dimensions required for introducing an expanding probe there are no weight advantages, and the second solution is usually not suitable for reasons of cost because the product must not be more expansive than conventional shafts.

SUMMARY OF THE INVENTION

It is therefore an object of the present invention to provide an assembled shaft of the above-mentioned type which has higher torsional strength and bending stiffness without losing its weight advantages and which is also suitable for smaller diameters. Pursuant to this object, and others which will become apparent hereafter, one aspect of the present invention resides in always inserting between two driving elements a sleeve which has a greater diameter than the tubular member and which comprises collar regions with a reduced diameter which are guided on the tubular member. The collar regions extend underneath the driving elements, preferably along half the axial length, and are clamped in between the tubular member and the driving elements in an essentially force locking way.

The invention therefore provides a shaft which, in the regions between the driving elements, consists of two shells with the diameter of the inner continuous tubular member being determined by the size of the cams and the diameter of the outer tubular member, consisting of individual sleeves, being permitted to be considerably larger and even extend beyond the cam contour to the extent that this is permitted by the assembly conditions around the shaft. As the polar resistance moment of a tube and thus the torsional stiffness increases with the power of four of the diameter, the benefit is considerably greater even if the slid-on sleeves are thin-walled, as would be the case if the wall thickness of the inner tubular member was increased. Therefore, the sleeves may be made of materials other than steel, i.e., materials which are lighter and/or more cost effective, such as aluminium, titanium or carbon fiber composite materials, used either exclusively or in composite form or combined with homogeneous plastics.

The inner continuous tubular member may also have a relatively small wall thickness, in which case it has essentially only a guiding and aligning function especially if reinforced supporting sleeves are used within the driving elements and also expanded. These supporting sleeves increase and largely maintain the flexible pretension for fixing the collar regions of the sleeves relative to the driving elements.

Of course the inner tubular member is important for torsional strength, with the critical areas being in the region of necking of the reinforcing sleeves directly adjoining a driving element. However, as a rule, even thin-walled tubes achieve a sufficient torsional strength. However, for the critical torsional stiffness the double shell design along the longer portions between two driving elements is decisive; it effectively prevents larger angles of torsion.

To be able to design the inner tubular member with a smaller wall thickness while simultaneously maintaining the flexible pre-tension required for clamping in the collar regions of the sleeve, two equivalent solutions are available. In a first embodiment it is possible to insert supporting sleeves of a slightly longer length than the driving elements underneath the driving elements. These supporting sleeves, together with the tubular member and the sleeves, are then expanded under plastic deformation relative to the driving elements, with the tubular member and the collar regions of the sleeves being subjected to the clamping-in effect.

According to a second embodiment, thickened wall portions are provided underneath the driving elements at the tubular member itself, which portions also have a slightly longer length than the driving elements and which, for production technical reasons, have a uniform inner diameter and are arranged on the outside of the tubular member. In the case of a hydraulic expansion involving plastic deformation, these regions of thickened wall portions are then capable of generating the elastic pre-tension required for clamping in the collar regions of the sleeves relative to the elastically deformed driving elements. Because of the greater radial difference between the two tubular structures this solution provides an improved bending stiffness, whereas in the case of the first embodiment, due to the larger diameter of the inner tubular member, the torsional stiffness is higher.

In a particularly advantageous embodiment of the process, the inner tubular member is shortened when fixing the driving elements, i.e., when applying pressure in the region of &he thickened wall portions or supporting sleeves, with the sleeve members previously inserted and in butt contact being subjected to axial pressure and coming to rest against the flanks of the driving elements in the region of the diameter step. This is achieved in that the region of expansion of the supporting members or thickened wall portions as pre-determined by the seals is slightly wider than the outer support provided by the driving elements. This results in bead-like expansions on both sides of the driving elements, which cause the desired shortening of the tubular member.

In the case of closely adjoining driving members, especially those which are designed in pairs in the form of cams with the same angular position of the raised cam portion, it is possible, in a further embodiment, that a sleeve connected so as to be integral with the driving members may connect these to form longer double driving elements. In this case, the effective diameter of the connecting sleeve should be as large as possible, and in particular, it should be increased to the smallest diameter of the driving elements across the circumference. Such driving elements connected to form double cams may be provided with apertures in the outer end faces of the raised cam portions to reduce weight.

In a further advantageous embodiment, if the driving elements are in the same axial end position, the reinforcing sleeves following at one end may be provided with collar regions which cover the entire width of the driving elements.

If in the case of a thin-walled tubular member the connecting driving elements, especially in the form of double cams, are held by an inserted supporting sleeve, this may preferably extend along the entire length of the adjoining connected driving member, but with the regions underneath the driving members being expanded in portions.

In an advantageous embodiment of the shaft in accordance with the invention the angular spaces formed by the tubular member and sleeve members are used for supplying lubricating oil to the driving elements or bearing regions. In this case it is necessary to provide an axial connection between the individual spaces, for example, in the form of longitudinal slots in the collar regions of the sleeve members if in the region of the diameter step from the collar regions to the outer sleeve there is a sealing contact at the flanks of the driving elements. Independently of the latter condition, axial throughbores or external axial grooves in the outer thickened wall portions of the tubular member may have the same effect.

In the case of the shaft according to the invention, with a sufficiently high torsional stiffness, it is also possible to produce cam shapes which in the base circle come close to the shaft diameter and which therefore cannot be produced as an assembled camshaft with a simple continuous tubular member. If suitably surface machined, the additional sleeves, without further measures, may serve as bearing regions for the shafts. However, it is also possible to provide the bearing regions in the form of bearing races which are matchingly arranged on the shaft like the driving elements and connected to it.

Preferred embodiments of the invention are illustrated in the drawing and described below.

DETAILED DESCRIPTION OF THE PREFERRED EMBODIMENTS

Figure 1:
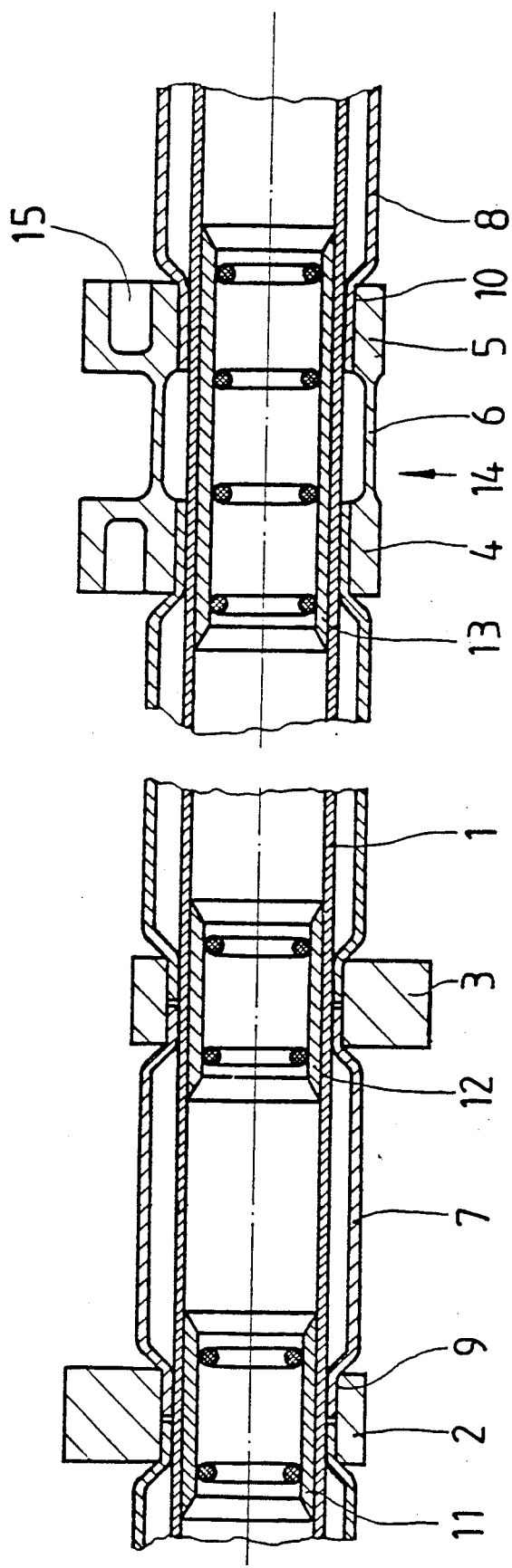
FIG. 1 shows a shaft in the form of a camshaft in accordance with the invention, with inner supporting sleeves.

FIG. 1 shows a continuous tubular member 1 attached, on the left, to two individual driving elements 2, 3 in the form of offset cams and, on the right, to a driving element 14 with two interconnecting driving members 4, 5 in the form of cams aligned at the same circumferential angle, with the latter being connected by a connection sleeve 6 so as to form one part. Reinforcing sleeves 7, 8 whose diameter is greater than that of the tubular member 1 are slid onto the tubular member 1 so as to adjoin the driving elements 2, 3, 14 and, respectively, be positioned between them, with collar regions 9, 10 with a reduced diameter having a guiding function relative to the tubular member and being inserted into the apertures of the driving elements 2, 3, 14. Whereas the collar regions 9 of the reinforcing sleeves 7, for the purpose of being inserted into the driving elements 2, 3, in the axial inner position, have approximately half the length of the driving elements and are in butt contact with each other, the collar regions 10 of the reinforcing sleeves 8, for the purpose of being inserted into double driving elements 14, only have the length of the individual driving members 4, 5. The figure shows that underneath the driving elements 2, 3, 14 there have been provided supporting sleeves 11, 12, 13 which are not absolutely essential and which are hydraulically expanded together with the tubular member 1 and the collar regions 9, 10 of the reinforcing sleeves 7, 8 and maintain the elastic pretension relative to the driving elements 2, 3, 14. Such inserted sleeves make it possible to reduce the wall thickness of the tubular member 1 and of the sleeves 7, 8 which in this embodiment generate only a small proportion of the pre-tension and are clamped-in in a force-locking way from the inside and outside.

For weight reducing purposes, the double driving element 14 has recesses 15 at the end faces of the driving elements 4, 5. A single longer supporting sleeve 13 has been inserted into the double driving element 14, with the sealing rings symbolically illustrated by thin lines defining those portions to which pressure is applied for expansion purposes; in the region of the supporting sleeves 13, these are individual longitudinal portions underneath the driving members 4, 5. If surface treated accordingly, the sleeves 6 or 7, 8 may serve as bearing regions, but alternatively it is also possible to attach round bearing races on the tubular member 1 in the same way as the driving elements 2 and 3. The control cams shown in the drawing may quite easily be replaced by gears for driveshafts or cranks for crankshafts.

Figure 2:
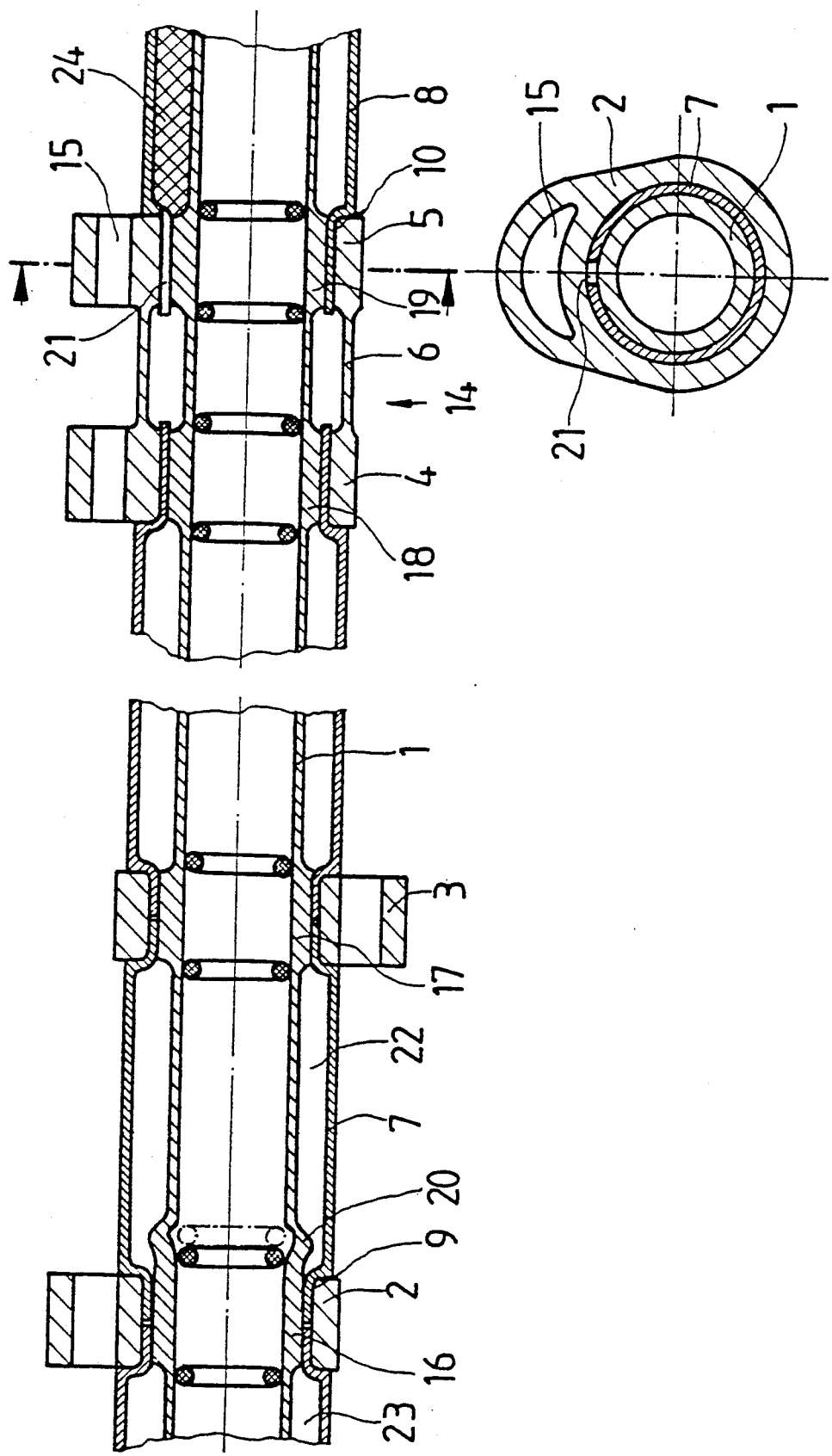
FIG. 2 shows a shaft in the form of a camshaft in accordance with the invention, with thickened wall portions of the tubular member.

FIG. 2 again shows a tubular member 1 which, underneath the driving elements 2, 3, 4, 5 has been provided with thickened wall portions 16, 17, 18, 19. Again, the driving elements 4 and 5 have been connected to form a double element 14 via a spacer sleeve 6. In the case of all driving elements continuous recesses 15 have been provided in the region of the raised cam portions. Outer sleeve members 7, 8 slid onto the tubular member 1 extend underneath the driving elements with collar regions 9, 10. The collar regions 9 are in butt contact underneath the driving elements 2, 3, whereas the collar regions 10 underneath the driving elements 4, 5 cover the entire width of the driving element and end freely. As indicated in the collar region 9 by a dashed, over-wide sealing assembly, it is possible to produce an expansion 20 at the tubular member 1 which leads to a shortening of the tubular member 1 and which causes the sleeves, in the region of their diameter step, to contact the end faces of the driving elements 2, 3. The resulting condition of tension in the inner and outer tube causes an increase in strength. In the section, the driving element 2 is illustrated with the continuous recess 15, and the region 9 of the sleeve 7 as well as the region of the thickened wall portions of the tubular member 1 is also identifiable. A detailed drawing shows a longitudinal slot 21 in the collar region of the sleeve member 7 via which the angular spaces 22, 23 between the tubular member 1 and the sleeve elements 7 are connected to permit the supply of lubricating oil. A further angular space 24 underneath the sleeve member 8 is filled with a damping material, at least across part of its circumference, so that the above-mentioned solution is not excluded.

While the invention has been illustrated and described as embodied in an assembled shaft, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

1. An assembled shaft comprised of a tubular member; individually slid-on driving cam elements which are attached to the tubular member; and a sleeve slid-on between each two driving elements, the slid-on sleeve having a diameter larger than that of the tubular member and having collar regions which have a reduced diameter and are guided on the tubular member, the collar regions being extended underneath the driving elements and fixed between the tubular member and the driving elements.

2. A shaft according to claim 1, wherein driving elements are provided in an axial end position on the tubular member, the collar region of the adjoining sleeve element having a length preferably corresponding to approximately the length of the driving element and being inserted into the driving element as far as a step in diameter.

3. A shaft according to claim 1, wherein the driving elements are arranged in an axial inner position on the tubular member, the collar regions of respective adjoining sleeve elements having a length corresponding to approximately half the length of the driving elements and being inserted into the driving elements as far as a step in diameter so as to be at least almost in butt contact with each other.

4. A shaft according to claim 1, wherein the outer diameter of the sleeve extends at least partially beyond the outer diameter of the driving elements.

5. A shaft according to claim 1, and further comprising supporting sleeves inserted in the region of the driving elements, and having at least a slightly greater length than the driving elements.

6. A shaft according to claim 5, wherein the tubular member and the supporting sleeves are made of steel.

7. A shaft according to claim 1, wherein the tubular member in the region of the driving elements is provided with one of internally and externally positioned thickened wall portions having an at least slightly greater length than the driving elements.

8. A shaft according to claim 7, wherein the tubular member, in the region of the outer thickened wall portions, underneath the driving elements, is provided with one of axial throughbores and axial outer grooves so as to connect individual annular spaces between the tubular member and the sleeve to form a lubricating oil channel.

9. A shaft according to claim 1, wherein the driving elements include double elements consisting of driving elements connected so as to be integral by means of a spacer sleeve arranged at a distance from the tubular member.

10. A shaft according to claim 1, wherein the tubular member is made of steel.

11. A shaft according to claim 1, wherein the driving elements consist of a cast material.

12. A shaft according to claim 11, wherein the driving elements are formed as control cams.

13. A shaft according to claim 1, wherein the slid-on sleeves are made of at least one of steel, aluminum, titanium, a carbon fiber composite, and a composite comprising at least one of steel, aluminum and titanium.

14. A shaft according to claim 1, wherein the slid-on sleeve, below the driving elements, with a sealing contact between the wall region at the diameter step and the flanks of the drive element, having longitudinal slots provided so as to connect individual annular spaces between the tubular member and the slid-on sleeve to form a lubricating oil channel.

15. A shaft according to claim 1, wherein driving elements are provided as part of a double element, the collar region of the adjoining sleeve element having a length preferably corresponding to approximately the length of the driving element and being inserted into the driving element as far as a step in diameter.

* * * * *